(12) United States Patent
Chang et al.

(10) Patent No.: US 12,192,336 B1
(45) Date of Patent: Jan. 7, 2025

(54) TRUSTED PLATFORM MODULE CRYPTOCURRENCY MINER WITH SECURE ZERO TOUCH PROVISIONING CAPABILITY

(71) Applicant: Auradine, Inc., Santa Clara, CA (US)

(72) Inventors: Lei Chang, Saratoga, CA (US); Robert Ashley, San Jose, CA (US); Liang Li, Cupertino, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 18/744,435

(22) Filed: Jun. 14, 2024

Related U.S. Application Data

(60) Provisional application No. 63/521,068, filed on Jun. 14, 2023.

(51) Int. Cl.
*H04L 9/40* (2022.01)
*H04L 9/08* (2006.01)
*H04L 9/32* (2006.01)

(52) U.S. Cl.
CPC .......... *H04L 9/0825* (2013.01); *H04L 9/0866* (2013.01); *H04L 9/3247* (2013.01)

(58) Field of Classification Search
CPC .... H04L 9/0825; H04L 9/0866; H04L 9/3247
See application file for complete search history.

(56) References Cited

U.S. PATENT DOCUMENTS

| | | | |
|---|---|---|---|
| 2008/0317004 A1* | 12/2008 | Cai | H04L 41/5087 370/352 |
| 2019/0108543 A1* | 4/2019 | Chan | H04L 9/3239 |
| 2019/0268142 A1* | 8/2019 | Leker | H04L 9/3239 |
| 2021/0250307 A1* | 8/2021 | Pal | H04L 67/61 |
| 2021/0256536 A1* | 8/2021 | Abdelsamie | G06Q 30/018 |
| 2022/0029801 A1* | 1/2022 | Velagapalli | H04L 9/0877 |
| 2023/0188363 A1* | 6/2023 | Aoshima | H04L 9/3268 713/156 |
| 2023/0354035 A1* | 11/2023 | Sun | H04W 12/088 |
| 2024/0169050 A1* | 5/2024 | Gehtman | G06F 21/44 |
| 2024/0193567 A1* | 6/2024 | Bettati | G06Q 20/123 |

* cited by examiner

*Primary Examiner* — Ghodrat Jamshidi
(74) *Attorney, Agent, or Firm* — Shield Intellectual Property PC; Kirk D. Wong

(57) ABSTRACT

A secure communications and configuration system for digital currency mining systems provides two levels of digital signatures for communications between digital currency mining systems and a central management server where general communications are signed using software generated keys and sensitive communications are signed using an on-board encryption chip. The central management server verifies an initial registration message from a digital currency mining system and send initial configuration data to the digital currency mining system automatically.

20 Claims, 4 Drawing Sheets

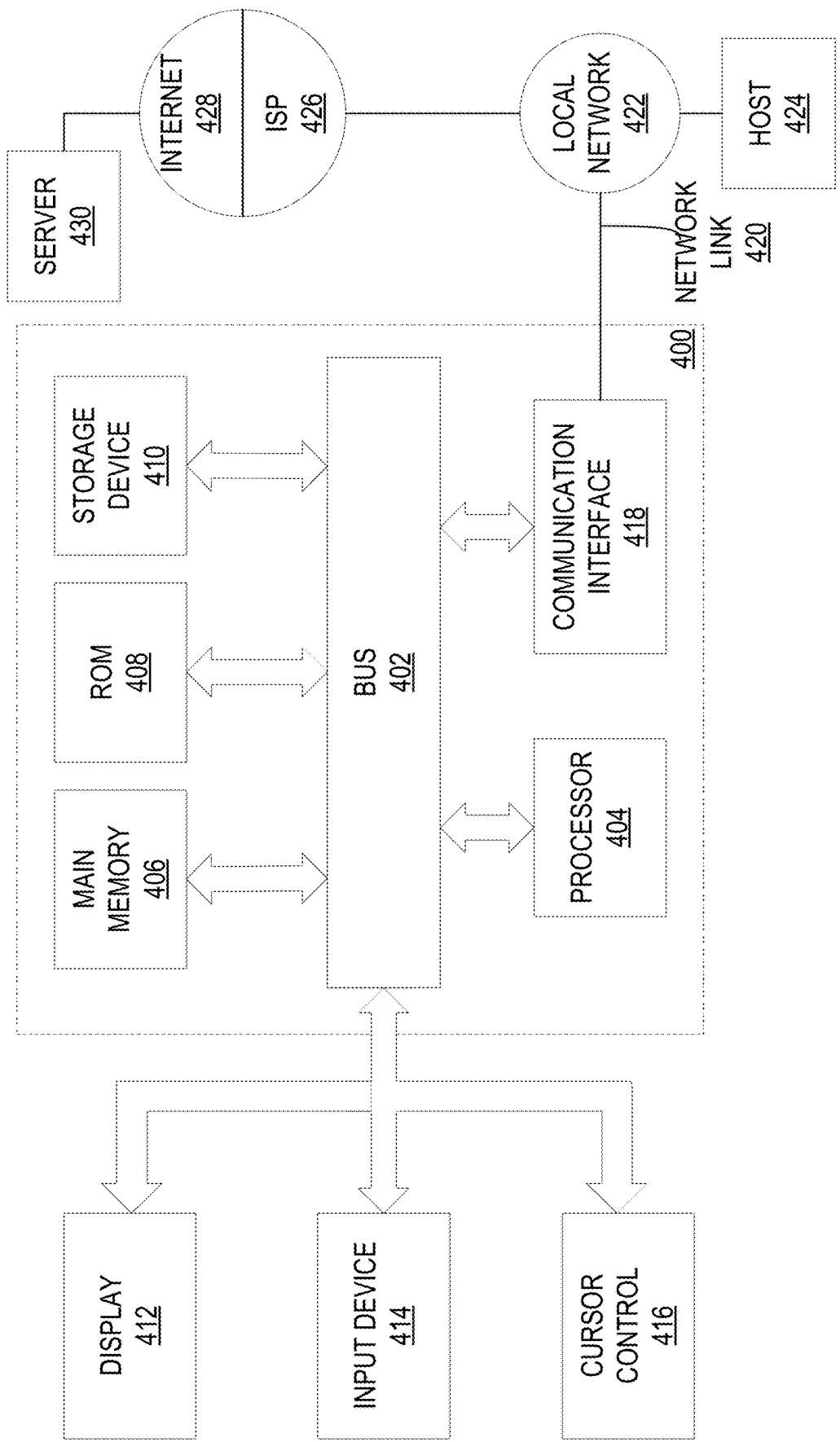

TRUSTED PLATFORM MODULE CRYPTOCURRENCY MINER WITH SECURE ZERO TOUCH PROVISIONING CAPABILITY

CROSS-REFERENCE TO RELATED APPLICATIONS

This application claims priority to Provisional Appln. No. 63/521,068 filed Jun. 14, 2023, the entire contents of the aforementioned are hereby incorporated by reference as if fully set forth herein, under 35 U.S.C. § 120.

TECHNICAL FIELD

Embodiments relate generally to improving computer system security, and, more specifically, to improving the security of cryptocurrency mining systems.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Cryptocurrency mining, e.g., bitcoin mining, is an asset-intensive task. When bitcoin mining is performed at an industrial scale, a large number of machines are deployed in large bitcoin mining sites. Current mining systems, when deployed at scale, may sit on the rack for hours or days before being configured to mine. This delay results in lost revenue for the site owner and at an industrial scale, the amount of lost revenue can be very large.

BRIEF DESCRIPTION OF DRAWINGS

The present invention is illustrated by way of example, and not by way of limitation, in the figures of the accompanying drawings and in which like reference numerals refer to similar elements and in which:

FIG. 4 is a block diagram of a computer system upon which embodiments of the invention may be implemented.

DETAILED DESCRIPTION OF THE INVENTION

Figure 1:
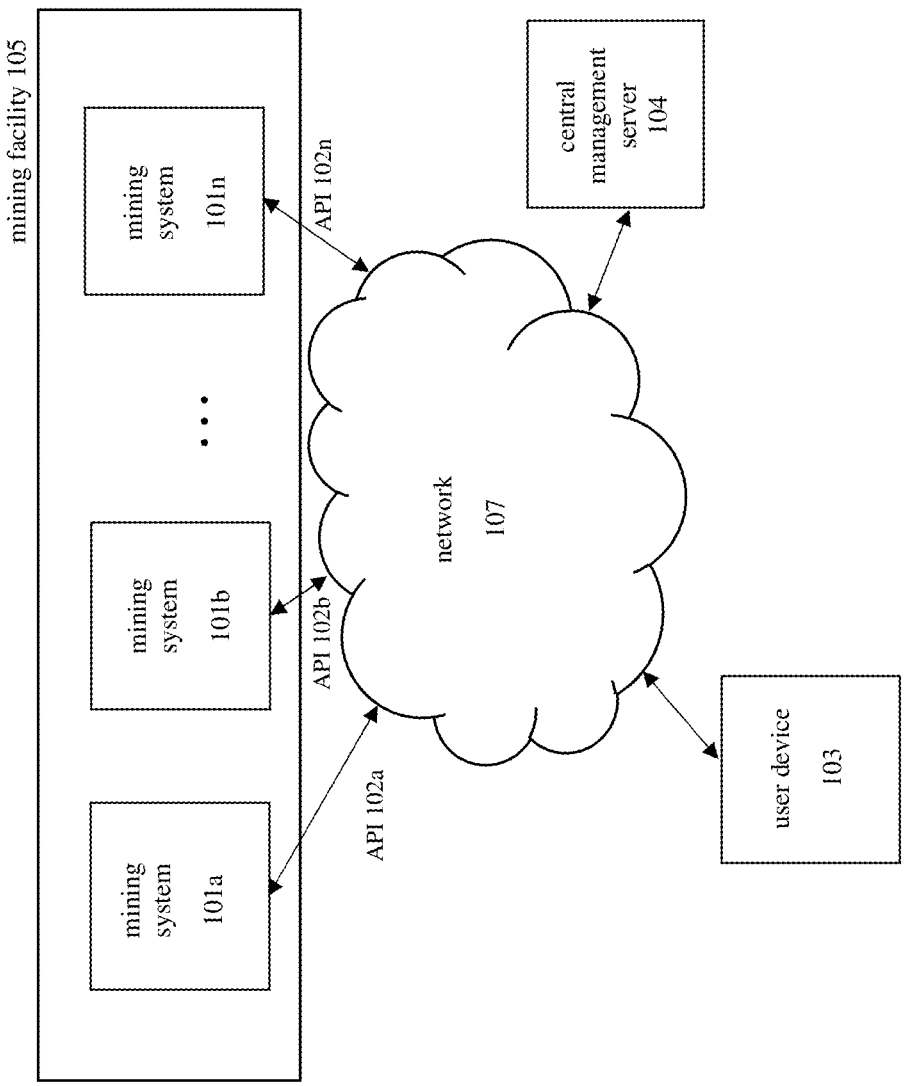
FIG. 1 illustrates a block diagram of a bitcoin mining environment, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0. System Architecture
3.0. Implementation Mechanism-Hardware Overview
4.0. Extensions and Alternatives

1.0 General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format and should be understood as merely a conceptual prelude to a more detailed description of example possible embodiments that follows below.

When digital currency/cryptocurrency mining systems, e.g., bitcoin mining systems are deployed in large industrial-scale mining facilities, technicians typically mount each system into their appropriate rack and connect the systems to the power. When the bitcoin mining systems are first booted up, the systems need to be configured. In the case where there are a large number of systems being brought online, the amount of work required to get each system up and running is onerous. Each system has traditionally been required to be configured manually in order for the system to start mining for the customer. Many bitcoin miner providers take advantage of the situation where, in a default configuration state, bitcoin mining systems are powered on in the customer's bitcoin mining facility by initializing the bitcoin mining systems to start mining immediately but for the bitcoin provider rather than the customer. By the time the customer's technicians have properly configured all of the systems, a large amount of time has passed where the bitcoin mining systems have not produced any results by sitting idle or, in some cases, the bitcoin mining systems have produced revenue for the bitcoin miner providers.

Zero Touch Provisioning (ZTP) has been used for networking devices and IoT devices. The method that is typically used in the networking industry is not secure because it is assumed that the device is correctly embedded with the appropriate link to the configuration server. The router, network device, etc., is configured at the factory with the link to the appropriate configuration server. Once the device boots up, it contacts the configuration server to download the latest firmware version. However, ZTP by itself is not secure for bitcoin mining systems which is one of the reasons why manual configuration is used.

Since bitcoin mining systems create currency, the possibility of a corrupt or hijacked mining system is the reason why manual configuration has been necessary. Embodiments discussed herein improve the performance and security of the mining systems by providing a secure configuration environment where the mining systems can be securely configured in a timely manner. Thus, downtime is substantially decreased and performance for the entire facility is substantially improved.

In an embodiment, a trusted platform module (TPM) chip is incorporated into each of the bitcoin mining systems in a mining facility. The TPM chip is a secure encryption chip that allows the mining system to uniquely identify itself to a central management server in two different ways that gives two levels of security, one for general messaging and one for sensitive messaging. The TPM chip works in conjunction with mining system software to facilitate secure configuration of the bitcoin mining system as well as secure registration and recovery operations.

2.0 System Architecture

Referring to FIG. 1, in an embodiment, a plurality of bitcoin mining systems 101a-101n reside in mining facility 105. Each bitcoin mining system 101a-101n provides an API 102a-102n where a user device 103 or cloud-based central management server 104 can communicate with and control the system over a network 107. The API 102a-102n can be used by higher level fleet management or data center management software 104 across the network 107 (e.g., Internet, intranet, etc.) to optimize fleetwide operational metrics across a plurality of bitcoin mining systems 101a-101n as well as quickly and automatically respond to fluctuating energy costs and curtailment events via dynamic configuration of the bitcoin mining systems 101a-101n. The API 102a-102n can also provide a GUI based interface to the user device 103, where the user can, for example, select which metric (e.g., throughput, efficiency, total power, etc.) to use and a slider to select the value of the metric.

In an embodiment, when multiple bitcoin mining systems 101a-101n are first booted up in the mining facility 105, each mining system 101a-101n reaches out to the central management/configuration server 104 to obtain initial configuration information in order to configure the bitcoin mining system to operate as per customer specifications. In order to perform this securely, each bitcoin mining system 101a-101n incorporates an on-board TPM chip that allows for secure communications between the bitcoin mining system 101a-101n and the cloud-based central management/configuration server 104.

Figure 2:
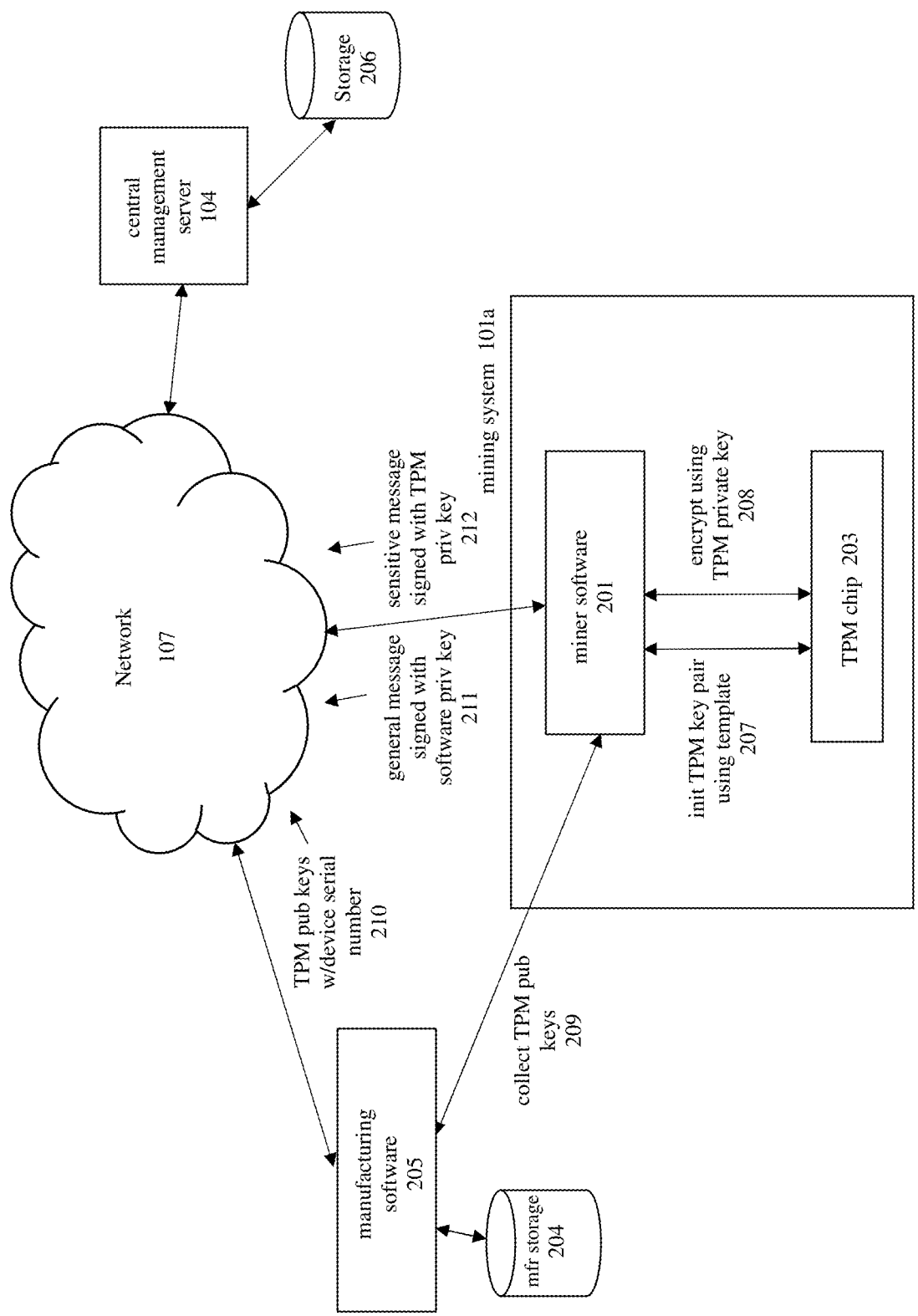
FIG. 2 illustrates a block diagram of communications between a mining system and manufacturing software and a central management server, according to an embodiment.

Referring to FIG. 2, a block diagram of communications between a mining system 101a and manufacturing software 205 and a cloud-based central management/configuration server 104 is illustrated.

An embodiment automatically configures a mining system on first boot using user configurable settings stored in the cloud network 107. One such configuration could be network settings, where a mining system can connect to a gateway, reach out to the cloud network 107, and configure its customer-defined network settings using configuration data from, for example, a central management server 104. Once on the secured network, the mining system can start to mine with the other cloud-set configurations e.g., pool, worker, energy consumption mode, etc.

In an embodiment, during the manufacturing process the TPM chip 203 is manufactured with a set of fixed seeds unique to the TPM chip 203. The fixed seeds allow the TPM chip 203 to generate consistent RSA/ECC key pairs. When the mining system 101a is first booted up during the manufacturing process, the TPM chip 203 generates a public key and miner software 201 reports it along with the serial number of the TPM chip 201 and the key pair 209 generated by miner software 201 to the manufacturing software 205. Manufacturing software 205 stores the public key along with the mining system device serial number and software key pair in the manufacturing storage 204.

Cloud-based central management server 104 gathers the public keys and device serial numbers 210 from the manufacturing software 205 across network 107. Note that the public keys and serial numbers may additionally or alternatively be stored at a secure mining system manufacturer's site that is accessible to customer-owned central management servers. Cloud-based central management server 104 stores the public key and device serial numbers in storage 206. In an embodiment, central management server 104 stores the public keys and device serial numbers in a lookup table or other data structure such that the public keys are associated with their corresponding serial numbers. Note that there may be more than one manufacturing software as well as more than one cloud-based central management server, e.g., each customer can implement a cloud-based central management server for their sites.

At initial on-site bootup of the mining system 101a, the TPM chip 203 private key and public key can be generated at startup with a fixed template 207. The fixed template ensures that the keys that are generated are always the same and unique for each TPM chip 203, thereby foregoing the need to store them long term on local disk storage. The TPM public key is retrieved from a TPM driver in miner software 201 during boot up. Secure zero touch provisioning then takes place if configured to do so.

During normal operation, two pairs of keys are used to communicate (e.g., via JSON Web Tokens (JWTs), etc.) with the central management server 104. A software generated (e.g., by miner software 201) key pair for normal, general communications 211 between the mining system 101a and the central management server 104 and a TPM key pair used for sensitive/security communications 212 such as device registration, ownership change etc. In general, using the TPM chip to encrypt messages is slower than using software keys to encrypt messages. The system improves the performance of the bitcoin mining systems as well as the cloud-based central management server by using the software keys whenever possible to make the communication paths more efficient and faster. Further, while typical systems manage their systems using a shared authorization certificate, an embodiment dramatically improves the security of the technology environment by storing unique authorization information for each device.

A message that is signed using the software key is used for general messaging to the cloud-based central management server 104. In normal operations, the message succeeds in verification by the cloud-based central management server 104. If a message fails verification, or a software key is missing from a recent factory reset, then software key pairs are purged from factory reset and the system reverts to using the TPM key as discussed below to onboard the device to the cloud-based central management server 104.

A message signed by the TPM chip 203 using the TPM key 208 is used for registering the software key pair with the cloud-based central management server 104 and initiating the secure zero touch provisioning. Miner software 201 sends the registration message to the TPM chip 203 to sign the message using the TPM private key. TPM chip 203 transmits the signed message 208 to the miner software 201. The registration message contains the mining system 101a serial number and the software public key. The message is signed using the TPM public key. Miner software 201 sends the signed message 212 to the cloud-based central management server 104. The cloud-based central management server 104 verifies the signature from the message using the TPM public key associated with the mining system 101a serial number stored in storage 206. In an embodiment, cloud-based central management server 104 uses the serial number to find the corresponding TPM public key in the data structure in storage 206. Cloud-based central management server 104 then hashes the message using the TPM public key and decrypts the signature using the TPM public key. If the hash value matches the decrypted signature from the message, then the message is valid. Upon verification, the cloud-based central management server 104 stores the software public key in association with the mining system 101a and sends configuration data to the mining system 101a. The central management server 104 has the ability to select which configuration data is used for each particular mining system, allowing for different configurations for certain groups of mining systems, types of mining systems (e.g., different hardware setups, different hardware vendors, etc.), etc. Configuration data can include the initial settings that the miner uses to start operations, e.g., power usage settings, target hash rates, WiFi settings, pool setting, worker ID, fan activation, etc. For example, an administrator may want to disable fans in the mining system when it is in standby mode if the facility is not set up for hot/cold aisles. Mining system 101a receives the configuration data and miner software 201 configures system parameters using the configuration data. Mining system 101a then operates using the updated system parameters. The configuration data can be updated at any time to change the ZTP configuration as conditions change in the facility and/or new mining systems. The entire communication exchange between miner software 201 and cloud-based central management server 104 can be encrypted using Transport Layer Security (TLS).

In an embodiment, the mining system 101a can retrieve a random server challenge (e.g., from/ping) to be included in the message (e.g., signed DATE, key in AWS KMS, etc.). The cloud-based central management server 104 verifies the message signature with the TPM public key (populated from the manufacturing process) that is associated with the mining system serial number in the storage 206 and records the new software public key in storage 206 to associate the software public key with the mining system 101a. If an action such as ownership change of the mining system 101a is required, the miner software 201 sends the ownership change message to the TPM chip 203 for the TPM chip 203 to sign the message using the TPM private key. Miner software 201 sends the signed message to the cloud-based central management server 104 as discussed above.

Figure 3:
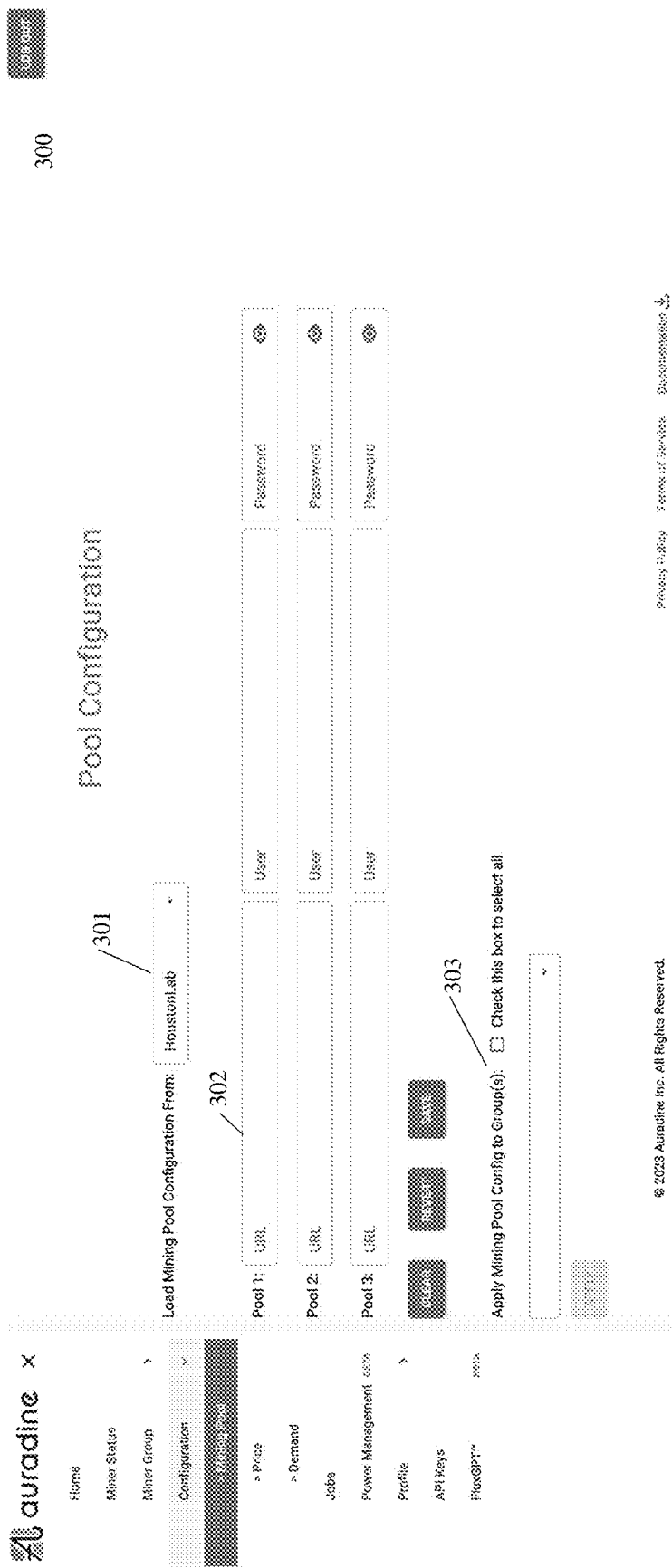
FIG. 3 illustrates a user interface for configuring mining systems, according to an embodiment.

Referring to FIG. 3, an example user interface screen 300 is shown that may be displayed by the central management server 104 to an administrator. The user interface screen 300 allows the administrator to configure the provisioning process. In an embodiment, the administrator can designate which configuration data to use for the entire facility (e.g., Default Group) or for individual pools 301. The administrator can designate the configuration data to be used per pool. Each individual pool may be configured using a separate configuration data file 302. Mining systems can be assigned to different groups and the administrator cn designate which groups are assigned to each pool 303.

Note that although bitcoin is mentioned specifically in the above discussions and examples, any digital/crypto currency that requires mining systems can be improved using the material discussed herein.

In an embodiment, an apparatus comprises a processor and is configured to perform any of the foregoing methods.

In an embodiment, one or more non-transitory computer-readable storage media, storing software instructions, which when executed by one or more processors cause performance of any of the foregoing methods.

Although separate embodiments are discussed herein, any combination of embodiments and/or partial embodiments discussed herein may be combined to form further embodiments.

3.0. Implementation Mechanisms-Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is device-specific to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using device-specific hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

4.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method comprising:
upon initial boot-up, generating a public key by an on-board encryption chip in a digital currency mining system;
sending, by the digital currency mining system, the public key and a digital currency mining system serial number to a manufacturing server;
sending, by the digital currency mining system, a registration message to a server, the registration message including a software generated public key and the digital currency mining system serial number, the registration message including a signature signed using the on-board encryption chip;

receiving, by the digital currency mining system, configuration data from the server;
setting, by the digital currency mining system, local parameters using the configuration data;
wherein general communication messages are signed using a software generated private key before sending the general communication messages to the server;
wherein sensitive communication messages are signed using the on-board encryption chip before sending the sensitive communication messages to the server.

2. The method of claim 1, further comprising:
receiving, by the server, the registration message;
comparing, by the server, the digital currency mining system serial number to a plurality of stored serial numbers;
verifying the signature in the registration message using a public key associated with the serial number;
associating the software generated public key with the serial number;
selecting configuration data for the digital currency mining system;
sending the configuration data to the digital currency mining system.

3. The method of claim 1, wherein the digital currency is bitcoin.

4. The method of claim 1, wherein the on-board encryption chip is manufactured with a unique set of fixed seeds.

5. The method of claim 1, further comprising:
retrieving, by the server, a plurality of digital currency mining system serial numbers and associated public keys from the manufacturing server;
storing, by the server, the plurality of digital currency mining system serial numbers and associated public keys in a storage device.

6. The method of claim 1,
wherein the manufacturing server stores the public key and the digital currency mining system serial number in a storage device.

7. The method of claim 1,
wherein the manufacturing server stores the public key and the digital currency mining system serial number in a storage device; and
wherein the manufacturing server sends the public key and the digital currency mining system serial number to the server.

8. One or more non-transitory computer-readable storage media, storing one or more sequences of instructions, which when executed by one or more processors cause performance of:
upon initial boot-up, generating a public key by an on-board encryption chip in a digital currency mining system;
sending, by the digital currency mining system, the public key and a digital currency mining system serial number to a manufacturing server;
sending, by the digital currency mining system, a registration message to a server, the registration message including a software generated public key and the digital currency mining system serial number, the registration message including a signature signed using the on-board encryption chip;
receiving, by the digital currency mining system, configuration data from the server;
setting, by the digital currency mining system, local parameters using the configuration data;
wherein general communication messages are signed using a software generated private key before sending the general communication messages to the server;
wherein sensitive communication messages are signed using the on-board encryption chip before sending the sensitive communication messages to the server.

9. The one or more non-transitory computer-readable storage media of claim 8, wherein the one or more sequences of instructions, when executed by the one or more processors cause further performance of:
receiving, by the server, the registration message;
comparing, by the server, the digital currency mining system serial number to a plurality of stored serial numbers;
verifying the signature in the registration message using a public key associated with the serial number;
associating the software generated public key with the serial number;
selecting configuration data for the digital currency mining system;
sending the configuration data to the digital currency mining system.

10. The one or more non-transitory computer-readable storage media of claim 8, wherein the digital currency is bitcoin.

11. The one or more non-transitory computer-readable storage media of claim 8, wherein the on-board encryption chip is manufactured with a unique set of fixed seeds.

12. The one or more non-transitory computer-readable storage media of claim 8, wherein the one or more sequences of instructions, when executed by the one or more processors cause further performance of:
retrieving, by the server, a plurality of digital currency mining system serial numbers and associated public keys from the manufacturing server;
storing, by the server, the plurality of digital currency mining system serial numbers and associated public keys in a storage device.

13. The one or more non-transitory computer-readable storage media of claim 8,
wherein the manufacturing server stores the public key and the digital currency mining system serial number in a storage device.

14. The one or more non-transitory computer-readable storage media of claim 8,
wherein the manufacturing server stores the public key and the digital currency mining system serial number in a storage device; and
wherein the manufacturing server sends the public key and the digital currency mining system serial number to the server.

15. A system comprising:
a digital currency mining system comprising:
one or more processors; and
a memory storing instructions, which when executed by the one or more processors, cause the one or more processors to perform:
upon initial boot-up, generating a public key by an on-board encryption chip in a digital currency mining system;
sending, by the digital currency mining system, the public key and a digital currency mining system serial number to a manufacturing server;
sending, by the digital currency mining system, a registration message to a server, the registration message including a software generated public key and the digital currency mining system serial number, the registration message including a signature signed using the on-board encryption chip;

receiving configuration data from the server;

setting local parameters using the configuration data;

wherein general communication messages are signed using a software generated private key before sending the general communication messages to the server;

wherein sensitive communication messages are signed using the on-board encryption chip before sending the sensitive communication messages to the server.

16. The system of claim 15, further comprising:

the server comprising:

one or more processors; and a memory storing instructions, which when executed by the one or more processors, cause the one or more processors to perform:

receiving the registration message;

comparing the digital currency mining system serial number to a plurality of stored serial numbers;

verifying the signature in the registration message using a public key associated with the serial number;

associating the software generated public key with the serial number;

selecting configuration data for the digital currency mining system;

sending the configuration data to the digital currency mining system.

17. The system of claim 15, wherein the digital currency is bitcoin.

18. The system of claim 15, wherein the on-board encryption chip is manufactured with a unique set of fixed seeds.

19. The system of claim 15, further comprising:

the server comprising:

one or more processors; and a memory storing instructions, which when executed by the one or more processors, cause the one or more processors to perform:

retrieving a plurality of digital currency mining system serial numbers and associated public keys from the manufacturing server;

storing the plurality of digital currency mining system serial numbers and associated public keys in a storage device.

20. The system of claim 15, further comprising:

the manufacturing server comprising:

one or more processors; and a memory storing instructions, which when executed by the one or more processors, cause the one or more processors to perform:

receiving the public key and the digital currency mining system serial number;

storing the public key and the digital currency mining system serial number in a storage device;

sending the public key and the digital currency mining system serial number to the server.

* * * * *